US012726591B2

(12) United States Patent
Kim et al.

(10) Patent No.: US 12,726,591 B2
(45) Date of Patent: Sep. 1, 2026

(54) VIDEO CONFERENCING DEVICE AND IMAGE ANALYSIS METHOD THEREOF

(71) Applicant: SAMSUNG ELECTRONICS CO., LTD., Suwon-si (KR)

(72) Inventors: Jaemyun Kim, Suwon-si (KR); Byeongjoon Noh, Suwon-si (KR); Dayun Kang, Suwon-si (KR); Eunkyung Kim, Suwon-si (KR); Eunji Kim, Suwon-si (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 225 days.

(21) Appl. No.: 18/421,554

(22) Filed: Jan. 24, 2024

(65) Prior Publication Data

US 2024/0370541 A1 Nov. 7, 2024

(30) Foreign Application Priority Data

May 2, 2023 (KR) ........................ 10-2023-0057245

(51) Int. Cl.
*H04N 7/15* (2006.01)
*G06V 20/40* (2022.01)
(Continued)

(52) U.S. Cl.
CPC ............. *H04N 7/155* (2013.01); *G06V 20/46* (2022.01); *H04L 65/403* (2013.01); *H04M 3/42059* (2013.01); *H04N 7/147* (2013.01); *H04N 21/4753* (2013.01); *G06F 21/32* (2013.01); *G06V 40/161* (2022.01); *H04L 65/1089* (2013.01)

(58) Field of Classification Search
None
See application file for complete search history.

(56) References Cited

U.S. PATENT DOCUMENTS 9,607,138 B1 3/2017 Baldwin et al.
9,769,307 B2 9/2017 Schrage et al.
(Continued)

FOREIGN PATENT DOCUMENTS

JP 2007-156768 A 6/2007
JP 2022-136312 A 9/2022
(Continued)

*Primary Examiner* — Quoc D Tran
(74) *Attorney, Agent, or Firm* — Sughrue Mion, PLLC

(57) ABSTRACT

The present disclosure provides methods and apparatuses for analyzing an image detected by a camera that includes sampling, by an image converter, a current frame from a video frame, detecting, by an image analyzer, at least one face and an object in the current frame, determining, by the image analyzer based on the detecting of the at least one face and the object, a number of people, a number of faces, and whether a facial feature in the current frame corresponds to an authorized person, and selecting, by the image analyzer, a security mode based on the number of people, the number of faces, and whether the facial feature corresponds to the authorized person. The selecting of the security mode includes accessing, based on the at least one face not being recognized, position information about the authorized person in at least one previous frame stored in a database.

20 Claims, 13 Drawing Sheets

(51) Int. Cl.

| | |
|---|---|
| ***H04L 65/403*** | (2022.01) |
| ***H04M 3/42*** | (2006.01) |
| ***H04N 7/14*** | (2006.01) |
| ***H04N 21/475*** | (2011.01) |
| *G06F 21/32* | (2013.01) |
| *G06V 40/16* | (2022.01) |
| *H04L 65/1089* | (2022.01) |

(56) References Cited

U.S. PATENT DOCUMENTS

| | | | | |
|---|---|---|---|---|
| 2009/0091420 | A1 | 4/2009 | Dobashi | |
| 2018/0211098 | A1 | 7/2018 | Tanaka et al. | |
| 2019/0147175 | A1* | 5/2019 | Varerkar .............. | G06V 10/764 726/26 |
| 2021/0064854 | A1 | 3/2021 | Chen | |
| 2021/0264137 | A1 | 8/2021 | Rao et al. | |
| 2022/0036708 | A1* | 2/2022 | Rey ........................ | H04N 7/147 |
| 2023/0049715 | A1 | 2/2023 | Kim et al. | |
| 2023/0351003 | A1* | 11/2023 | Springer ............... | H04L 65/403 |
| 2024/0089403 | A1* | 3/2024 | Shin ..................... | G06V 40/172 |

FOREIGN PATENT DOCUMENTS

| | | | |
|---|---|---|---|
| KR | 10-2010-0012124 | A | 2/2010 |
| KR | 10-1055335 | B1 | 8/2011 |
| KR | 10-2123248 | B1 | 6/2020 |
| KR | 10-2245501 | B1 | 4/2021 |
| KR | 10-2023-0025205 | A | 2/2023 |

* cited by examiner

Video Stream

1210

Image converter

1230

Image Analyzer

Mode_1

Mode_2

Mode_3

Mode_4

FIG. 6

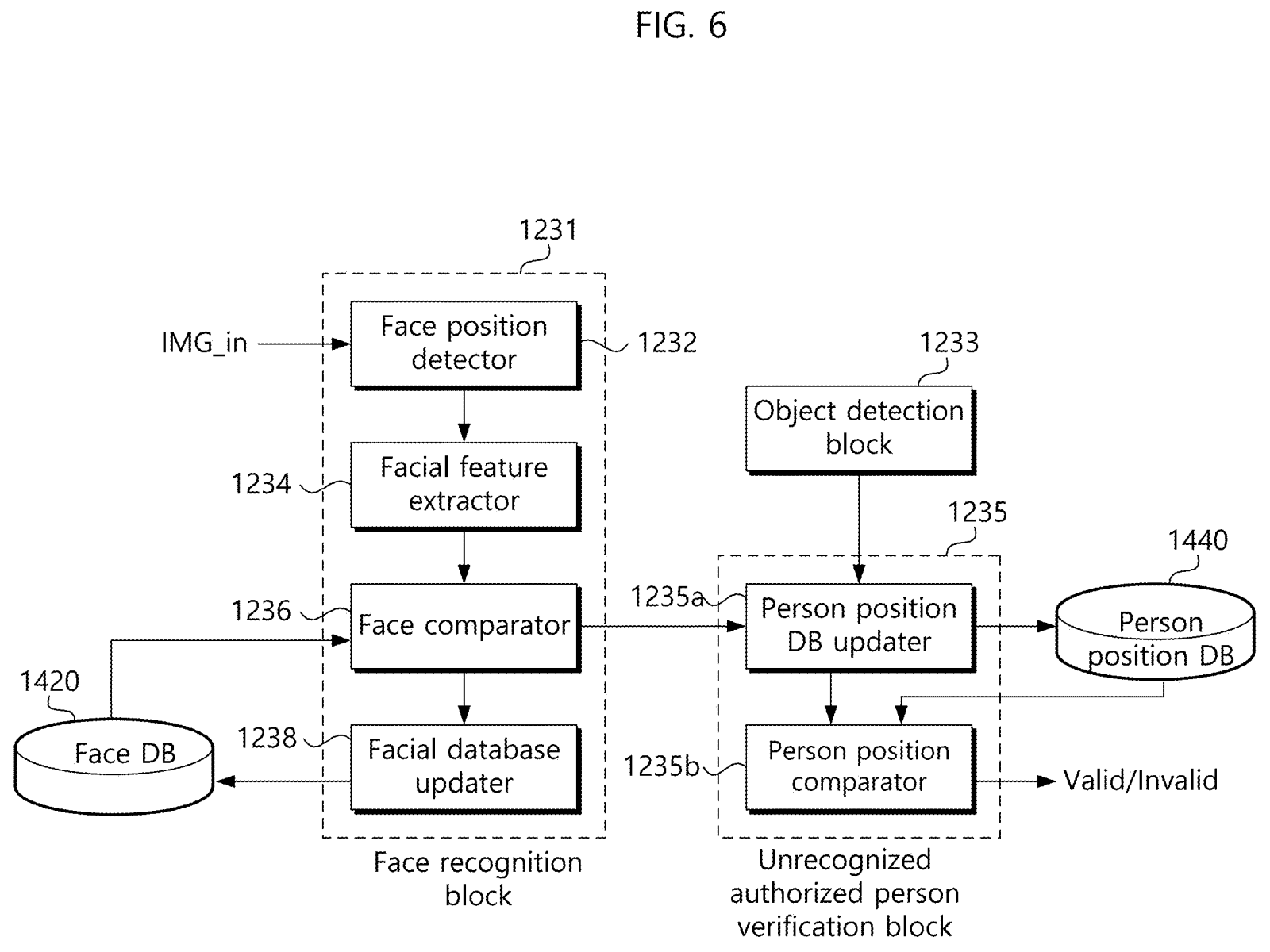

IMG_in
1231
1232
Face position detector
1234
Facial feature extractor
1236
Face comparator
1238
Facial database updater
Face recognition block
1420
Face DB
1233
Object detection block
1235
1235a
Person position DB updater
1235b
Person position comparator
Unrecognized authorized person verification block
1440
Person position DB
Valid/Invalid

FIG. 8

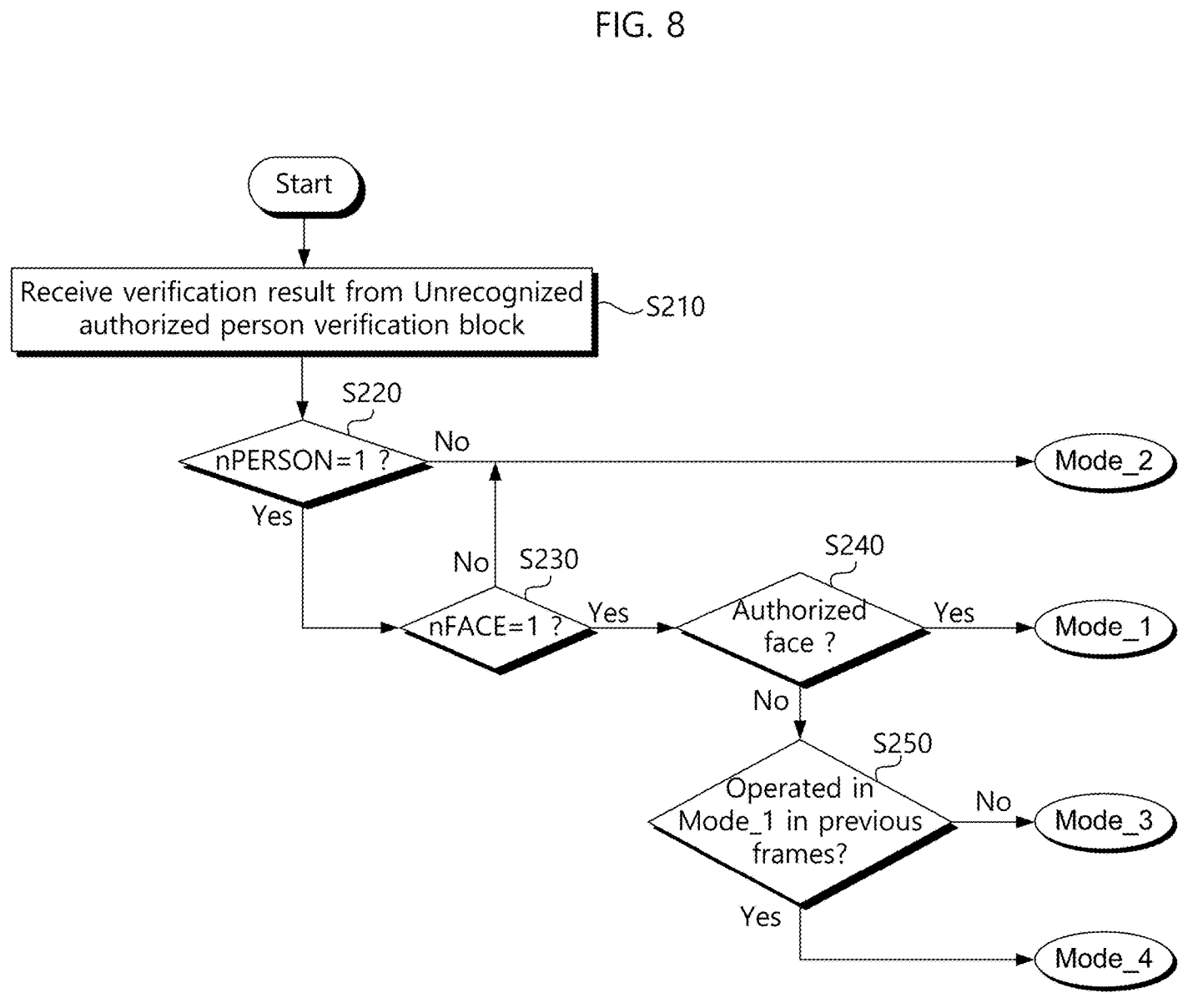

Start

S210
Receive verification result from Unrecognized authorized person verification block S220
nPERSON=1 ?
Yes
No S230
nFACE=1 ?
Yes
No S240
Authorized face ?
Yes
No S250
Operated in Mode_1 in previous frames?
Yes
No Mode_2
Mode_1
Mode_3
Mode_4

FIG. 9

| Current video frame(#N) | | | Authorization history of the previous video frames(#N-n) | Mode_i |
|---|---|---|---|---|
| nFACE | Authorization | nPERSON | | |
| 0 | - | 0 | - | Mode_2 |
| | - | 1 | YES | Mode_4 |
| | - | 1 | NO | Mode_3 |
| 1 | YES | 1 | - | Mode_1 |
| | NO | 1 | NO | Mode_3 |
| | NO | 1 | YES | Mode_4 |
| 2≤ | - | - | - | Mode_2 |
| - | - | 2≤ | - | Mode_2 |

Video frame (#M)

1613

1423

Blurred face of authorized person

Mode_4

1605

1445

1425

Previous video frame (#M-n)

VIDEO CONFERENCING DEVICE AND IMAGE ANALYSIS METHOD THEREOF

CROSS-REFERENCE TO RELATED APPLICATIONS

This application claims benefit of priority under 35 U.S.C. § 119 to Korean Patent Application No. 10-2023-0057245, filed on May 23, 2023, in the Korean Intellectual Property Office, the disclosure of which is incorporated by reference herein in its entirety.

BACKGROUND

1. Field

The present disclosure relates generally to a video conference system, and more particularly, to a video conferencing device capable of efficiently processing an unrecognized person in a video and a video analysis method thereof.

2. Description of Related Art

Recently, telecommuting has become common due to various factors. When working at home, it may be common to exchange opinions and/or receive work instructions with colleagues through a video conference using video conferencing devices. The video conferencing devices may need to support security functions in order to maintain confidentiality of the video conferences. For example, the video conferencing devices may distinguish whether a video conference user (e.g., participant) detected through a camera is an authorized person or an unauthorized person. In such an example, if an unauthorized person is detected, the detection of the unauthorized person may be regarded as a security threat. As a result, the video conferencing devices may block the video conference application and/or may block unauthorized people from accessing the video conference.

However, problems such as, but not limited to, noise, poor bandwidth, glitches, and the like, may deteriorate the image quality, and as result, may cause an authorized person to not be recognized. Thus, there exists a need for further improvements in video conferencing technology to provide stable video conference quality and maintain high security performance.

SUMMARY

Aspects of the present disclosure provide for a video conferencing device and an image analysis method that provide high recognition and authentication performance of an authorized person even in a case of poor image quality that may be caused by various factors such as, but not limited to, noise in an input image, motion of the user, and/or illumination changes.

According to an aspect of the present disclosure, a method of analyzing an image detected by a camera is provided. The method includes sampling, by an image converter, a current frame from a video frame. The method further includes detecting, by an image analyzer, at least one face and an object in the current frame. The method further includes determining, by the image analyzer based on the detecting of the at least one face and the object, a number of people, a number of faces, and whether a facial feature in the current frame corresponds to an authorized person. The method further includes selecting, by the image analyzer, a security mode based on the number of people, the number of faces, and whether the facial feature corresponds to the authorized person. The selecting of the security mode includes accessing, based on the at least one face not being recognized, position information about the authorized person in at least one previous frame stored in a database.

According to an aspect of the present disclosure, a video conferencing device for determining a security mode by processing a video stream provided through a camera is provided. The video conferencing device includes an image converter configured to sample, from the video stream, a video frame, and an image analyzer configured to detect, in the video frame, at least one face and an object, and select the security mode by detecting whether a number of people, a number of faces, and facial features in the video frame correspond to an authorized person. The image analyzer is further configured to select the security mode by referring to information about the authorized person extracted from at least one previous video frame based on the at least one face not being recognized in the video frame.

According to an aspect of the present disclosure, a video analysis method for determining a security mode of a video stream is provided. The video analysis method includes detecting a number of people, a number of faces, and at least one facial feature in a frame sampled from the video stream. The video analysis method further includes selecting the security mode based on at least one of the number of people, the number of faces, and whether the at least one facial feature corresponds to an authorized person. The selecting of the security mode includes determining, based on a face not being recognized in the frame, the security mode of the frame according to information about the authorized person detected in at least one previous frame sampled prior to the frame.

Additional aspects may be set forth in part in the description which follows and, in part, may be apparent from the description, and/or may be learned by practice of the presented embodiments.

BRIEF DESCRIPTION OF DRAWINGS

The above and other objects and features of the present disclosure may be more apparent from the following description taken in conjunction with the accompanying drawings, in which:

FIG. 3 is a block diagram showing the structure of the image analysis software, according to an embodiment of the present disclosure;

FIG. 6 is a block diagram showing the configuration of the face recognition block and the unrecognized authorized person verification block of FIG. 5, according to an embodiment of the present disclosure;

FIG. 8 is a flowchart showing an embodiment of a method for determining a security mode, according to an embodiment of the present disclosure;

FIG. 9 is an exemplary table showing a security threat determination policy, according to an embodiment of the present disclosure;

FIG. 13 shows an example in which a video frame is determined as a fourth operation mode Mode_4 according to the security policy, according to an embodiment of the present disclosure.

DETAILED DESCRIPTION

Figure 1:
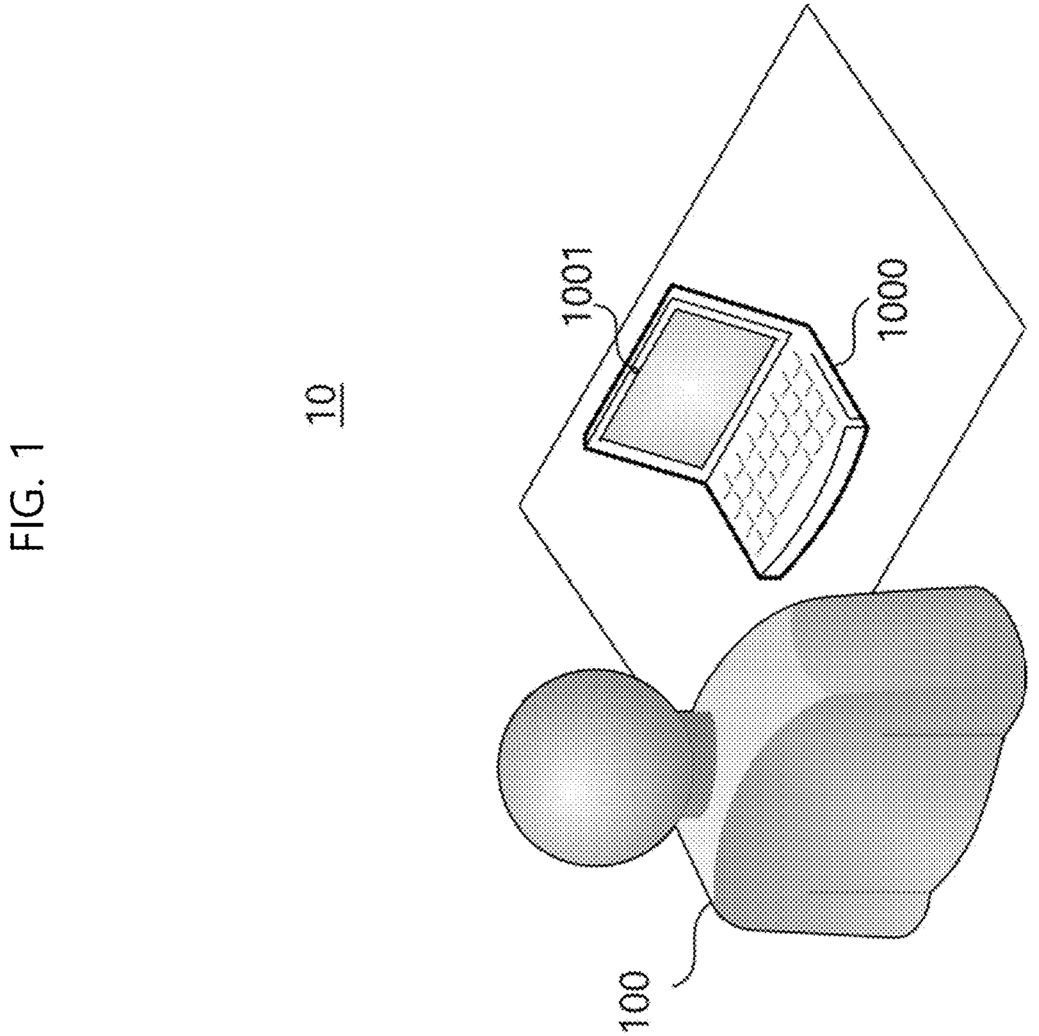
FIG. 1 is a diagram showing a video conference environment using an image recognition-based video conferencing device, according to an embodiment of the present disclosure.

The following description with reference to the accompanying drawings is provided to assist in a comprehensive understanding of embodiments of the present disclosure defined by the claims and their equivalents. Various specific details are included to assist in understanding, but these details are considered to be exemplary only. Therefore, those of ordinary skill in the art may recognize that various changes and modifications of the embodiments described herein may be made without departing from the scope and spirit of the disclosure. In addition, descriptions of well-known functions and structures are omitted for clarity and conciseness.

With regard to the description of the drawings, similar reference numerals may be used to refer to similar or related elements. That is, whenever possible, the same reference numbers may be used in the description and drawings to refer to the same or like parts.

It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "connected with," or "connected to" another element (e.g., a second element), it means that the element may be coupled with the other element directly (e.g., wired), wirelessly, or via a third element.

Reference throughout the present disclosure to "one embodiment," "an embodiment," "an example embodiment," or similar language may indicate that a particular feature, structure, or characteristic described in connection with the indicated embodiment is included in at least one embodiment of the present solution. Thus, the phrases "in one embodiment", "in an embodiment," "in an example embodiment," and similar language throughout this disclosure may, but do not necessarily, all refer to the same embodiment.

It is to be understood that the specific order or hierarchy of blocks in the processes/flowcharts disclosed are an illustration of exemplary approaches. Based upon design preferences, it may be understood that the specific order or hierarchy of blocks in the processes/flowcharts may be rearranged. Further, some blocks may be combined or omitted. The accompanying claims present elements of the various blocks in a sample order, and are not meant to be limited to the specific order or hierarchy presented.

The embodiments herein may be described and illustrated in terms of blocks, as shown in the drawings, which carry out a described function or functions. These blocks, which may be referred to herein as units or modules or the like, or by names such as device, logic, circuit, counter, comparator, generator, converter, or the like, may be physically implemented by analog and/or digital circuits including one or more of a logic gate, an integrated circuit, a microprocessor, a microcontroller, a memory circuit, a passive electronic component, an active electronic component, an optical component, and the like, and may also be implemented by or driven by software and/or firmware (configured to perform the functions or operations described herein).

Hereinafter, various embodiments of the present disclosure are described with reference to the accompanying drawings.

FIG. 1 is a diagram showing a video conference environment utilizing a video conferencing device, according to an exemplary embodiment of the present disclosure. Referring to FIG. 1, a video conference environment 10 in which a user 100 uses a video conferencing device 1000 including a camera 1001 is illustrated.

The video conference environment 10 may be and/or may include, for example, at least one of environments in which the user 100 may work from home using the video conferencing device 1000, perform online learning, attend an online meeting, take an online test, and the like. In other words, the video conference environment 10 may not be limited to a conference environment but may include various telecommuting environments in which the camera 1001 may be operated. Alternatively or additionally, the video conference environment 10 may use a Geographic Information System (GIS) and an object monitoring system based on video data. For example, the video conference environment 10 may be and/or may include a security environment that may be configured to identify whether an object that has entered a special (e.g., restricted access) area, such as, but not limited to, a port, an airport, a military ammunition depot, and the like, is an authorized user object and/or an unauthorized user object.

The video conferencing device 1000 may be and/or may include at least one of a smart phone, a portable terminal, a mobile terminal, a foldable terminal, a personal computer (PC), a laptop computer, a tablet PC, a personal digital assistant (PDA), a wearable device (e.g., smart watch, headset, headphones, and the like), and a smart device (e.g., a voice-controlled virtual assistant, a set-top box (STB), a smart television (TV), a refrigerator, an air conditioner, a microwave, and the like), an Internet-of-Things (IoT) device, and/or other various terminal devices and/or data processing devices.

In an embodiment, the video conference environment 10 may limit (e.g., restrict) the users 100 that may be allowed to access the video conferencing device 1000. For example, a face and/or an object of the user 100 appearing in the image provided by the camera 1001 may be detected by a security application and/or security algorithm running in the video conferencing device 1000. As used herein, the user 100 detected by the camera 1001 may refer to one person and/or a plurality of people. In an embodiment, the video conferencing device 1000 may perform authentication to determine whether or not the detected at least one face corresponds to an authorized person. Alternatively or additionally, the video conferencing device 1000 may detect an unauthorized object such as, but not limited to, a mobile phone and/or a camera, on the image provided by the camera 1001 to control access of the user 100 to the video conferencing device 1000.

The video conferencing device 1000 may use previously stored facial information about an authorized person to perform user authentication. That is, user authentication may be performed by comparing face information about the authorized person stored in the database with the face of the user 100 provided through the camera 1001. Alternatively or additionally, various biometric authentication methods and/or techniques may be utilized for user authentication. For example, the video conferencing device 1000 may perform iris detection and/or iris authentication instead of, or in addition to, face detection and/or face authentication. As another example, the video conferencing device 1000 may perform voice recognition as an alternate and/or additional authentication method. The video conferencing device 1000 may set the video conferencing device 1000 to one of a locked state and an unlocked state based on a result of at least one of the face detection, the face authentication, and the unauthorized object detection.

In an embodiment, the video conferencing device 1000 may detect the face of the user 100 from an input image for user authentication. The video conferencing device 1000 may identify whether the face of the recognized user 100 corresponds to an authorized person and/or an unauthorized person. For example, the video conferencing device 1000 may identify an unauthorized person, absence of an authorized person, appearance of a plurality of people, and/or an unrecognized authorized person that may pose a security threat based on the face of the recognized user 100. As used herein, the unrecognized authorized person may refer to an authorized person that may not be normally recognized by the video conferencing device 1000 due to at least one of movement of the user 100, changes in surrounding environment (e.g., illuminance), noise, and the like.

The video conferencing device 1000 may set the video conferencing device 1000 to an unlocked state when user authentication is successful for the face of the user 100 detected in the input image. Alternatively or additionally, the video conferencing device 1000 may detect, in the input image, an unauthorized object such as, but not limited to, a camera and/or a mobile phone, as such an unauthorized object may pose a security risk. For example, the user 100 may capture the screen of the video conferencing device 1000 using a camera or mobile phone, which may pose a risk of leaking security data. As a result, the video conferencing device 1000 may set the video conferencing device 1000 to a locked state when an unauthorized object is detected in the input image and/or video, when the face of an authorized person is not detected, when face authentication fails, and/or when a plurality of faces are detected.

In environments such as, but not limited to, telecommuting, online meetings, online learning, and/or online exams, the risk of leakage of information, learning content, and/or test content from the company and/or institution where the user 100 works may be relatively high when compared to offline environments. For example, the video conference environment 10 may be typically deployed and/or implemented for the user 100 to use the video conferencing device 1000 alone in an independent space for security purposes. Accordingly, the video conferencing device 1000 may determine a case in which a plurality of faces are detected as a security threat.

For example, even if the user 100 is an authorized person in the input image and/or video, the video conferencing device 1000 may determine a security threat due to at least one of various environmental changes, noise, and/or movement of the user 100. For example, when processing is based on real-time video information (e.g., video security analysis in telecommuting), the authentication result may react sensitively to noise in the input video. That is, under conditions such as a movement of the user and/or a sudden change in illumination, the video conferencing device 1000 may momentarily fail to recognize an authorized person. In such a case, access to the video conferencing device 1000 may be blocked even to an authorized person.

In addition to the security functions and embodiments described above, the video conferencing device 1000 of the present disclosure may normally perform authentication of an authorized person by utilizing previously received video information even when the video state of the authorized person is poor (e.g., low video quality below a certain threshold).

Figure 2:
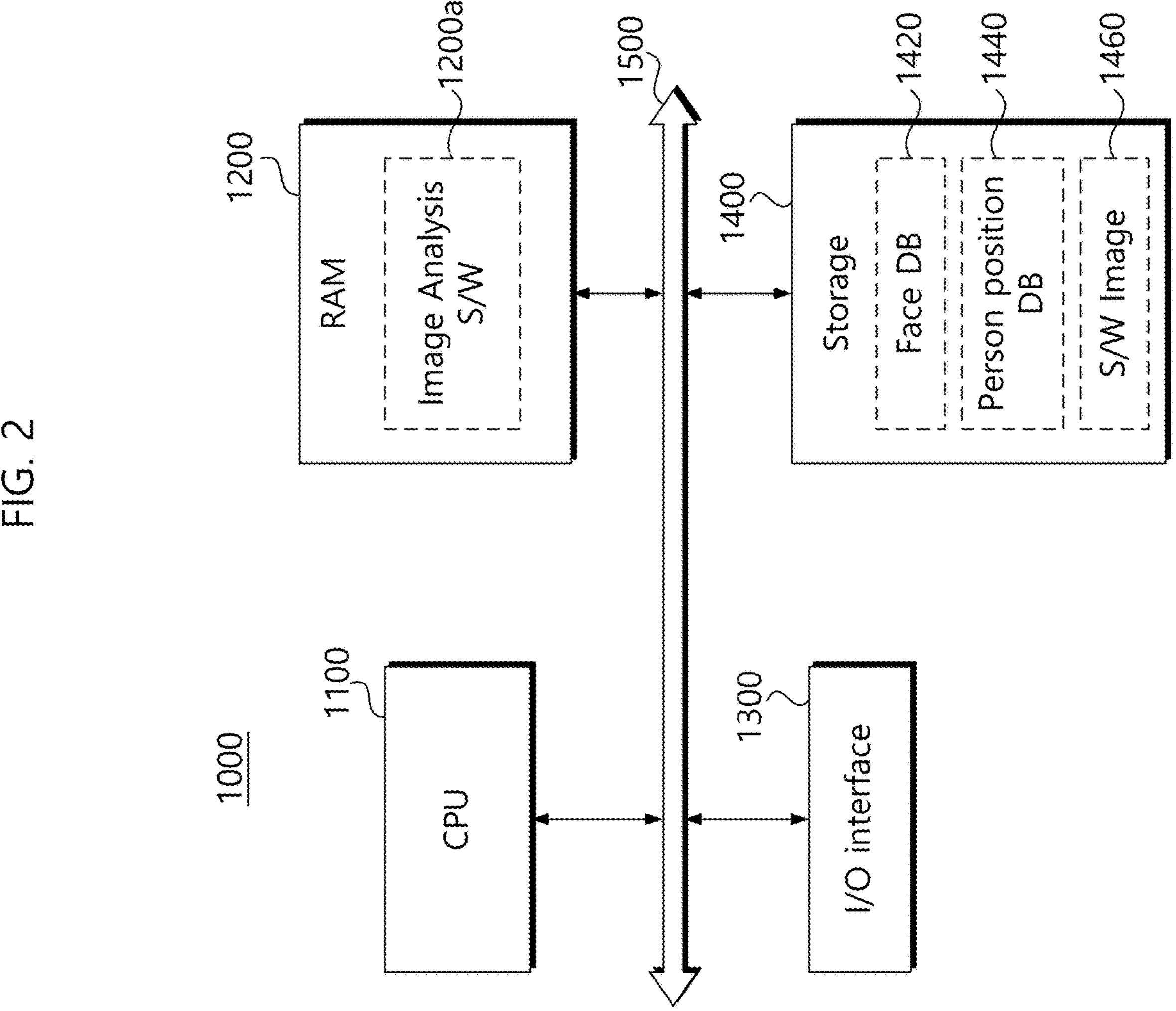
FIG. 2 is a block diagram exemplarily showing the hardware structure of a video conferencing device, according to an embodiment of the present disclosure.

FIG. 2 is a block diagram exemplarily showing the hardware structure of a video conferencing device, according to an embodiment of the present disclosure. Referring to FIG. 2, the video conferencing device 1000 may include a central processing unit (CPU) 1100, a random access memory (RAM) 1200, an input/output (I/O) interface 1300, a storage 1400, and a system bus 1500.

The CPU 1100 may execute software (e.g., application, programs, operating systems (OS), and/or device drivers) driven by the video conferencing device 1000. The CPU 1100 may execute an operating system loaded into the RAM 1200. The CPU 1100 may execute various applications and/or programs to be driven based on the operating system. For example, the CPU 1100 may execute an image analysis software (S/W) **1200*a* that may be loaded in the RAM 1200**.

The image analysis software **1200*a* may be executed by the CPU 1100 and may identify whether the face of the user 100 recognized in the image corresponds to an authorized person and/or an unauthorized person. The CPU 1100 may apply a security policy such as, but not limited to, identifying the unauthorized person, absence of the authorized person, appearance of a plurality of people, and/or verification of an unrecognized authorized person, which may be examples of security threats based on the face of the recognized user 100. For example, when the image analysis software 1200*a* is executed, under a condition such as, but not limited to, a motion of the user 100 and/or a sudden change in illuminance, the CPU 1100** may normally perform authentication of an authorized person by utilizing previously received image information.

The operating system, applications, and/or programs may be loaded into the RAM 1200. In an embodiment, when the video conferencing device 1000 boots (e.g., starts and/or is activated from a turned off state), an OS image that may be stored in the storage 1400 may be loaded into the RAM 1200 according to a booting sequence. The input/output operations of the video conferencing device 1000 may be supported by the operating system. Alternatively or additionally, applications and/or programs selected by the user and/or applications and/or programs configured to provide basic services may be loaded into the RAM 1200. In an embodiment, the image analysis software 1200*a*, which may provide a security function during a video conference, may be loaded into the RAM 1200 from the storage 1400. The RAM 1200 may be and/or may include a volatile memory such as, but not limited to, static RAM (SRAM) and/or dynamic RAM (DRAM), and/or may be and/or may include a non-volatile memory such as, but not limited to, phase-change RAM (PRAM), magnetoresistive RAM (MRAM), resistive RAM (ReRAM), ferroelectric RAM (FRAM), and/or NOR flash memory.

The image analysis software 1200*a* may analyze the image provided by the camera 1001 and may determine whether there is a security threat. That is, the image analysis software 1200*a* may determine the unauthorized person, the absence of an authorized person, and/or the appearing the plurality of people as the security threat based on the face and person position information about the user 100. For example, the image analysis software 1200*a* may perform verification using a previously stored video frame in the case of the unrecognized authorized person. The image analysis software 1200*a* may perform authentication of the unrecognized authorized person by comparing input human position information in a current video frame with previously input human position information about the authorized person.

In an embodiment, the image analysis software 1200*a* may set the security device of the video conferencing device 1000 to an unlocked state when user authentication is successful for the face of the user 100 detected in the input image. Alternatively or additionally, the image analysis software 1200*a* may set the security device of the video conferencing device 1000 to a locked state when an unauthorized object is detected in the image, the face of an authorized person is not detected, face authentication fails, and/or a plurality of faces are detected. Specific operating procedures of the image analysis software 1200*a* and/or example processes for determining a security threat are described below with reference to the drawings.

The input/output (I/O) interface 1300 may control user input and/or output from and/or to user interface devices. For example, the input/output interface 1300 may include one or more components that may permit the video conferencing device 1000 to receive information (e.g., commands, data), such as via user input (e.g., a touch screen, a keyboard, a keypad, a mouse, a stylus, a button, a switch, a microphone, a camera, a virtual reality (VR) headset, haptic gloves, and the like). Alternatively or additionally, the input/output interface 1300 may include one or more sensors for sensing information (e.g., a global positioning system (GPS) component, an accelerometer, a gyroscope, an actuator, a transducer, a contact sensor, a proximity sensor, a ranging device, a camera, a video camera, a depth camera, a time-of-flight (TOF) camera, a stereoscopic camera, and the like). In an embodiment, the input/output interface 1300 may include more than one of a same sensor type (e.g., multiple cameras). In an embodiment, the input/output interface 1300 may one or more components that may provide output information (e.g., commands, data) from the video conferencing device 1000 to the user 100 (e.g., a display, a liquid crystal display (LCD), light-emitting diodes (LEDs), organic light emitting diodes (OLEDs), a haptic feedback device, a speaker, a buzzer, an alarm, and the like). Data for setting the image analysis software 1200*a* may also be provided through the input/output interface 1300.

The storage 1400 may be and/or may include a storage medium of the video conferencing device 1000. For example, the storage 1400 may store applications, programs, operating system images, and the like. In an embodiment, the storage 1400 may include a face database 1420 to be used for authentication of the image analysis software 1200*a* and a person position database 1440 together with the software image 1460 of the image analysis software 1200*a*. In an embodiment, the image analysis software 1200*a* may be configured to update face information corresponding to an authorized person in the face database 1420, if the user detected in the current video frame is found to be the authorized person. Alternatively or additionally, when an unrecognized authorized person is detected, the image analysis software 1200*a* may be configured to access face information in the previous frame stored in the face database 1420 for authentication of the unrecognized authorized person. In an embodiment, position information of a person within the current frame and/or position information within the frame of a person determined to have no security threat may be continuously updated in the person position database 1440, if the person is determined to have no security threat (e.g., is authorized and/or allowed to be present).

The storage 1400 may be and/or may include a memory card (e.g., multi-media card (MMC), embedded MMC (eMMC), secure digital (SD), micro SD (MicroSD), and the like) and/or a hard disk drive (HDD). The storage 1400 may be and/or may include a NAND-type flash memory having a large storage capacity. Alternatively or additionally, the storage 1400 may include a next-generation nonvolatile memory such as, but not limited to, a PRAM, an MRAM, a ReRAM, an FRAM, and/or a NOR flash memory.

The system bus 1500 may be and/or may include a bus configured to provide a network inside the video conferencing device 1000. For example, through the system bus 1500, the CPU 1100, the RAM 1200, the input/output interface 1300, and the storage 1400 may be connected (e.g., communicatively coupled) and/or may exchange data with each other. However, the configuration of the system bus 1500 is not limited to the above description. For example, the system bus 1500 may further include mediation functionality for potentially providing efficient resource management.

According to the above description, the video conferencing device 1000 may detect and/or cope with various security threats by analyzing an input image. That is, even when the image and/or video state is poor (e.g., low image quality), the authorized user may be normally authenticated by utilizing previously received video information. Therefore, it may be possible to provide security authentication for an unrecognized authorized person even if the input image and/or video was generated in the presence of at least one of noise, environmental change, and/or movement of the user 100.

The number and arrangement of components of the video conferencing device 1000 shown in FIG. 2 are provided as an example. In practice, there may be additional components, fewer components, different components, or differently arranged components than those shown in FIG. 2. Furthermore, two or more components shown in FIG. 2 may be implemented within a single component, or a single component shown in FIG. 2 may be implemented as multiple, distributed components. Alternatively or additionally, a set of (one or more) components shown in FIG. 2 may be integrated with each other, and/or may be implemented as an integrated circuit, as software, and/or a combination of circuits and software.

Figure 3:
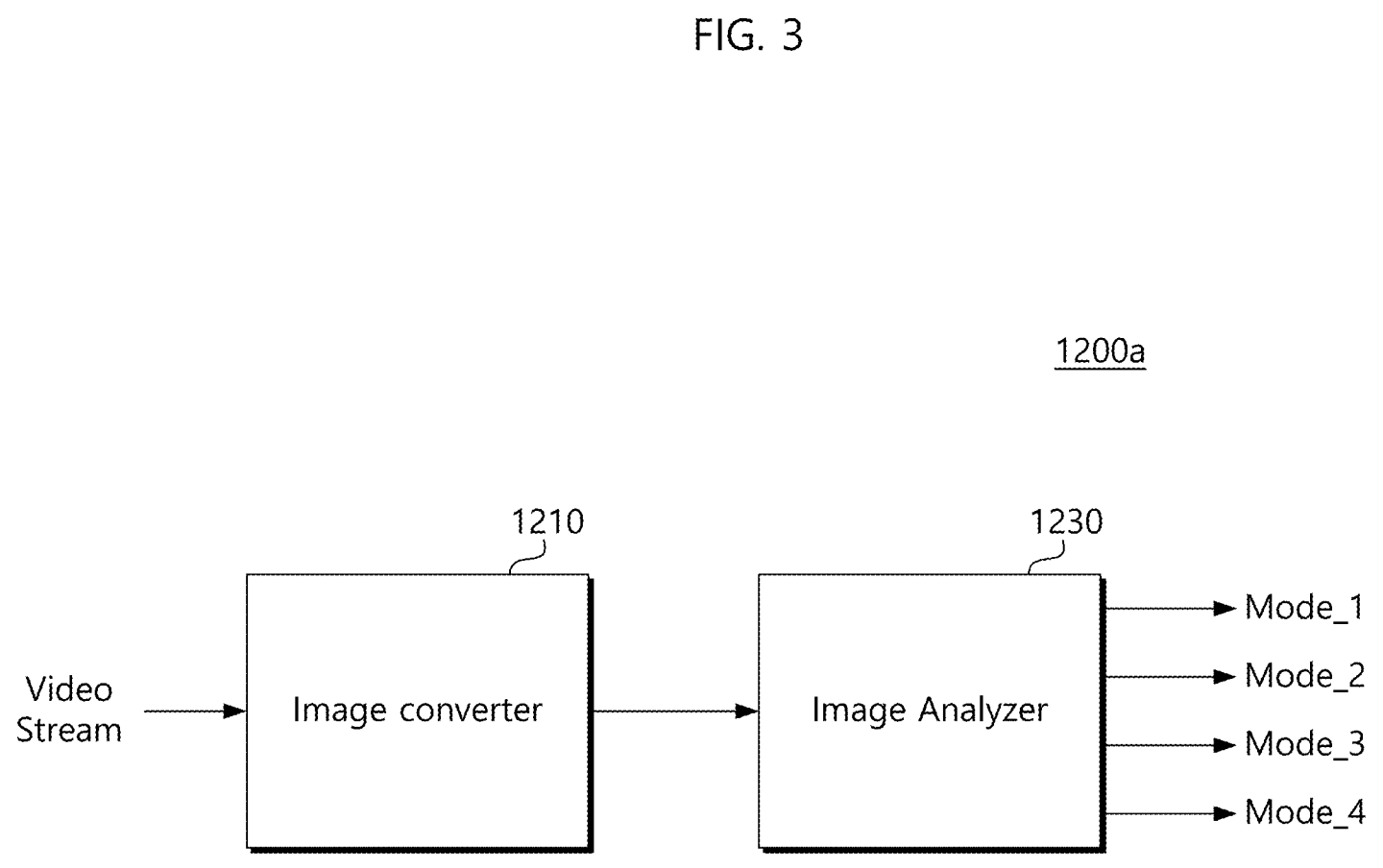

FIG. 3 is a block diagram showing an example structure of the image analysis software, according to an embodiment of the present disclosure. Referring to FIG. 3, the image analysis software 1200*a* may include an image converter 1210 and an image analyzer 1230.

The image converter 1210 may obtain a video frame from an input video stream image, and may apply sub-sampling, scaling, and/or pixel format conversion to the obtained video frame. That is, the image converter 1210 may generate a video frame in a format that may be processed by the image analyzer 1230.

The image analyzer 1230 may extract face information and/or human position information about the user 100 from the video frame provided by the image converter 1210. In an embodiment, the image analyzer 1230 may compare the extracted facial features with the previously stored facial features of the authorized person to determine whether the user 100 is authorized. Alternatively or additionally, the image analyzer 1230 may determine four security modes according to a user authentication result of the current video frame. For example, when there is one user detected in the current video frame and the user is determined to be an authorized user, the image analyzer 1230 may determine the security mode as a first operation mode Mode_1. The first operation mode Mode_1 may indicate a normal mode. Alternatively or additionally, when no person is detected in the current video frame and/or when two or more people and/or faces are detected, the image analyzer 1230 may determine the security mode as a second operation mode Mode_2. The second operation mode Mode_1 may indicate a danger mode. Alternatively or additionally, when the image analyzer 1230 detects that there is one user detected in the current video frame and determines the one user to be an unauthorized person, the image analyzer 1230 may determine the security mode as a third operation mode Mode_3. The third operation mode Mode_3 may indicate a danger mode. Alternatively or additionally, if there is one face and/or unrecognized user in the current video frame and the security mode of the reference frame in the previous video frame has not been determined as the first operation mode Mode_1, the image analyzer 1230 may determine the security mode as the third operation mode Mode_3, which may indicate a danger mode.

In an embodiment, if the extracted face information is in an unrecognized state and the security mode of a previously stored reference frame has been determined as the first operation mode Mode_1, the image analyzer 1230 may determine the security mode as a fourth operation mode Mode_4. The fourth operation mode Mode_4 may indicate a suspension of determination (e.g., judgement suspension). Alternatively or additionally, the image analyzer 1230 may set the fourth operation mode Mode_4 when the extracted facial information is detected as an unauthorized person and the security mode of a previously stored reference frame has been determined as the first operation mode Mode_1.

The number and arrangement of components of the image analysis software 1200*a* shown in FIG. 3 are provided as an example. In practice, there may be additional components, fewer components, different components, or differently arranged components than those shown in FIG. 3. Furthermore, two or more components shown in FIG. 3 may be implemented within a single component, or a single component shown in FIG. 3 may be implemented as multiple, distributed components. Alternatively or additionally, a set of (one or more) components shown in FIG. 3 may be integrated with each other, and/or may be implemented as an integrated circuit, as software, and/or a combination of circuits and software.

As described above, when the face of a user is not recognized in the video frame, the image analyzer 1230 may determine the security mode of the current video frame using the security mode in the previous video frame and the position information about the person. Accordingly, the video conferencing device 1000 may be capable of determining the security mode of an unrecognized authorized user due to blurring and/or obscuring of the screen due to at least one of noise, illumination change, and motion of the user.

Figure 4:
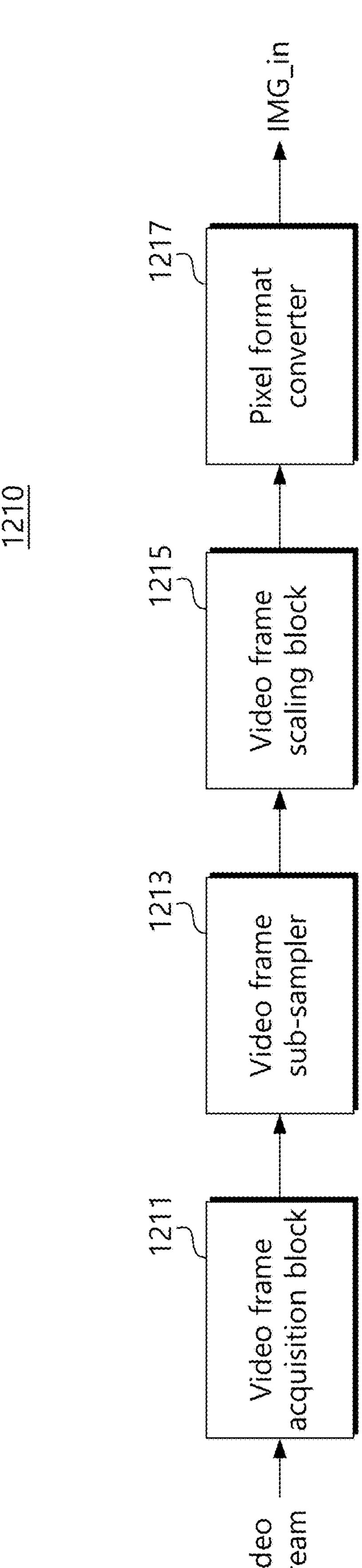
FIG. 4 is a block diagram showing the configuration and operation of the image converter of FIG. 3, according to an embodiment of the present disclosure.

FIG. 4 is a block diagram showing the configuration and operation of the image converter 1210 of FIG. 3, according to an embodiment. Referring to FIG. 4, an image converter 1210 may include a video frame acquisition block 1211, a video frame sub-sampler block 1213, a video frame scaling block 1215, and a pixel format converter block 1217. The image converter 1210 may convert an input video stream into a data format for face recognition and object detection in the image analyzer 1230.

The video frame acquisition block 1211 may receive a continuous input video stream provided a camera (e.g., camera 1001 of FIG. 1). The video frame acquisition block 1211 may receive continuous video streams in the form of stream data and may transfer the received video streams to the video frame sub-sampler block 1213.

The video frame sub-sampler block 1213 may sample the obtained video stream in units of specific frames. That is, the video frame sub-sampler block 1213 may sample the video stream in a frame-per-second (FPS) size. For example, in order to determine the security threat of telecommuting, the video frame sub-sampler block 1213 may sample a video stream at a sampling rate of 1.43 FPS. That is, in such an example, one frame may be sampled about every 700 milliseconds (ms).

The video frame scaling block 1215 may adjust the sampled frame to a frame size that may be processed by the image analyzer 1230. For example, the image analyzer 1230 may need an image frame having a size of 1280×780 pixels in order to perform face recognition on the sampled frame. Accordingly, the video frame scaling block 1215 may adjust the size of the sampled frame to 1280×780 pixels. As another example, the image analyzer 1230 may need an image frame having a size of 640×640 pixels in order to perform object recognition on the sampled frame. Accordingly, the video frame scaling block 1215 may adjust the sampled frame to a 640×640 size. If the size of the sampled frame is 1920×1080, the video frame scaling block 1215 may adjust the size of the sampled frame to a size suitable for the image analyzer 1230 using techniques such as, but not limited to, pixel sub-sampling, linear interpolation, and the like.

The pixel format converter block 1217 may convert the image format of the scaled frame into a format needed by the image analyzer 1230. For example, the pixel format converter block 1217 may convert a 640×640 size image that may have been scaled for object recognition and/or a 1280×780 scaled image that may have been scaled for face recognition into a color space such as, but not limited to, red-green-blue (RGB), luma-chroma (YCbCr), hue saturation value (HSV). Alternatively or additionally, the pixel format converter block 1217 may perform various format conversion functions to at least one of the pixel formats. The format-converted frame may be provided as an input image IMG_in to the image analyzer 1230.

The number and arrangement of components of the image converter 1210 shown in FIG. 4 are provided as an example. In practice, there may be additional components, fewer components, different components, or differently arranged components than those shown in FIG. 4. Furthermore, two or more components shown in FIG. 4 may be implemented within a single component, or a single component shown in FIG. 4 may be implemented as multiple, distributed components. Alternatively or additionally, a set of (one or more) components shown in FIG. 4 may be integrated with each other, and/or may be implemented as an integrated circuit, as software, and/or a combination of circuits and software.

Figure 5:
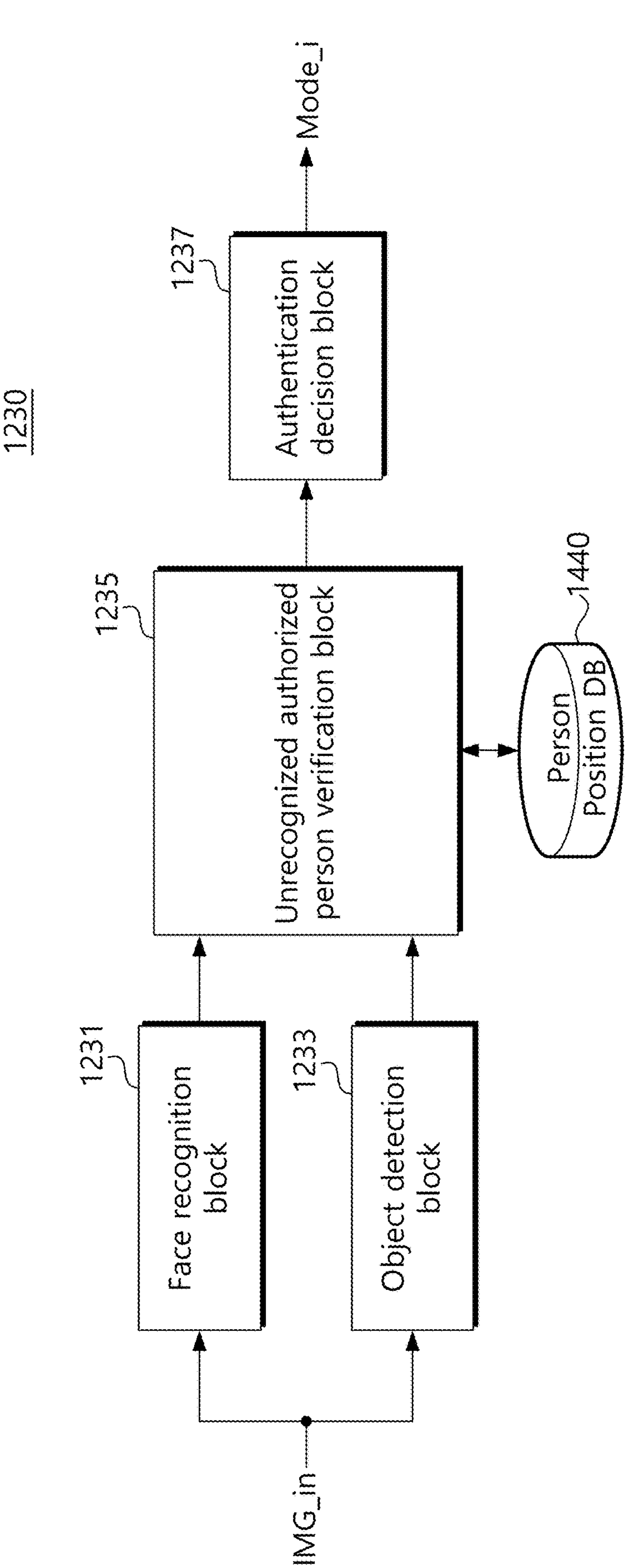
FIG. 5 is a block diagram showing the configuration and operation of the image analyzer of FIG. 3, according to an embodiment of the present disclosure.

FIG. 5 is a block diagram showing the configuration and operation of the image analyzer 1230 of FIG. 3, according to an embodiment. Referring to FIG. 5, the image analyzer 1230 may include a face recognition block 1231, an object detection block 1233, an unrecognized authorized person verification block 1235, and an authentication decision block 1237. The image analyzer 1230 may process the input image IMG_in to perform operations such as, but not limited to, recognizing a face of a user, recognizing an object, and processing an unrecognized person. Alternatively or additionally, it may be possible to determine whether the user 100 is a security threat by collecting the results of these operations.

The face recognition block 1231 may detect and/or recognize a face of a person included in the input image IMG_in. The face recognition block 1231 may detect and/or select a pixel region corresponding to a location of a person's face in the input image IMG_in. Alternatively or additionally, the face recognition block 1231 may process the selected face location to extract facial features. The face recognition block 1231 may compare the extracted facial feature information about the user and facial feature information about the authorized person to determine whether the user is authorized. That is, the face recognition block 1231 may determine whether the extracted facial feature information about the user corresponds to the facial feature information about the authorized person. Alternatively or additionally, when the face recognition block 1231 determines that the face-recognized user is an authorized person, the face database 1420 of FIG. 2 may update facial feature information about the authorized person extracted from the current video frame.

The object detection block 1233 may detect the type and number of objects including people in the input image IMG_in. For example, the object detection block 1233 may determine a bounding box for the detected person. The object detection block 1233 may transfer to the unrecognized authorized person verification block 1235 whether or not there is a security threat based on the number and location of the detected person. The object detection algorithm may be and/or may include a machine learning model, neural network, and/or knowledge network such as, but not limited to, a convolutional neural network (CNN), a You Look Only Once (YOLO) network, a region-based CNN (R-CNN), a vision transformer, and/or the like.

The unrecognized authorized person verification block 1235 may determine whether a security threat occurs when the image and/or video is blurred and/or covered due to movement of the authorized person and/or a change in illumination, and/or when the state of the authorized user is not good (e.g., does not meet a certain threshold) within the video frame. When the unrecognized authorized person verification block 1235 determines that the user detected by the face recognition block 1231 is an authorized person and/or there is no security threat based on the object detected by the object detection block 1233, the unrecognized authorized person verification block 1235 may update the position information about the user. The unrecognized authorized person verification block 1235 may compare the person position information detected in the current video frame with the person position information stored in the person position database 1440 to determine the validity of the person position information of the current user. That is, if the unrecognized authorized person verification block 1235 determines that the user is an authorized person and the person position information does not pose a security threat in the current frame being processed, the person position database 1440 may be updated with the person position information in the current frame.

In an embodiment, when the face of the user is not normally recognized (e.g., using the current frame), the unrecognized authorized person verification block 1235 may compare the person position information detected in the current video frame with the person position information stored in the person position database 1440. Alternatively or additionally, when the position information about the person in the current frame and the position information about the person stored in the person position database 1440 are the same, the unrecognized authorized person verification block 1235 may notify the authentication decision block 1237 that the location is the same. In such an embodiment, the authentication decision block 1237 may determine the unrecognized authorized person and determine the security mode as judgment suspension. Alternatively or additionally, when the position information about the person in the current frame and the position information about the person stored in the person position database 1440 are different, the unrecognized authorized person verification block 1235 may determine that the user is an unauthorized user.

The authentication decision block 1237 may determine the security mode (e.g., first operation mode Mode_1, second operation mode Mode_2, third operation mode Mode_3, and fourth operation mode Mode_4, hereinafter generally referred to as Mode_i, where i is a positive integer greater than zero (0) and less than or equal to four (4)) by referring to whether or not there is a security threat provided by the unrecognized authorized person verification block 1235. Alternatively or additionally, the authentication decision block 1237 may execute a security operation corresponding to the determined security mode Mode_i. For example, the authentication decision block 1237 may set the video conferencing device 1000 to a locked state in a mode determined to be a security threat. Alternatively or additionally, if the person in the image and/or video frame is determined to be an unrecognized authorized person (e.g., if the security mode is determined to be fourth operation mode Mode_4 indicating that the decision is suspended), the authentication decision block 1237 may suspend the security mode determination of the current video frame and determine the security mode in the next video frame.

The number and arrangement of components of the image analyzer 1230 shown in FIG. 5 are provided as an example. In practice, there may be additional components, fewer components, different components, or differently arranged components than those shown in FIG. 5. Furthermore, two or more components shown in FIG. 5 may be implemented within a single component, or a single component shown in FIG. 5 may be implemented as multiple, distributed components. Alternatively or additionally, a set of (one or more) components shown in FIG. 5 may be integrated with each other, and/or may be implemented as an integrated circuit, as software, and/or a combination of circuits and software.

The image analyzer 1230 described above may determine an operating mode by comparing the person position information detected in the current video frame with the person position information stored in the person position database 1440 even when the face of the user is not normally recognized. That is, even when the face of the user is not normally recognized by the unrecognized authorized person verification block 1235, the video conferencing device 1000 may be maintained in an active state without locking.

FIG. 6 is a block diagram showing exemplary configurations of the face recognition block 1231 and the unrecognized authorized person verification block 1235 of FIG. 5, according to an embodiment. Referring to FIG. 6, the face recognition block 1231 may include a face position detector 1232, a facial feature extractor 1234, a face comparator 1236, and a face database updater 1238. The unrecognized authorized person verification block 1235 may include a person position database updater 1235*a* and a person position comparator 1235*b*.

The face position detector 1232 of the face recognition block 1231 may detect the position of a face of a person in the input current frame. The face position detector 1232 may generate face position information using a face recognition/identification model. For example, real-time-based Haar-like feature information may be used as a face recognition/identification model executed by the face position detector 1232. Alternatively or additionally, a machine learning algorithm such as, but not limited to, a support vector machine (SVM) and/or an artificial neural network-based algorithm such as, but not limited to, a CNN may be used as a face recognition/identification model.

The facial feature extractor 1234 may extract facial features from the facial position area selected by the face position detector 1232. The facial feature extractor 1234 may use a method of expressing overall facial information as a dense feature. Alternatively or additionally, the facial feature extractor 1234 may utilize a method of representing the eyes, nose, mouth, eyebrows, chin, and the like of the face based on facial landmarks. A model such as a machine learning algorithm such as, but not limited to, an SVM and/or an algorithm based on an artificial neural network such as, but not limited to, a CNN may be used as a facial feature extraction model of the facial feature extractor 1234. However, the models referred to in the present disclosure are not limited to the models disclosed herein. That is, other machine learning algorithms, neural networks, and/or knowledge networks may be used without deviating from the scope of the present disclosure.

The face comparator 1236 may compare the facial feature information about the user extracted from the facial feature extractor 1234 with the facial feature information about the authorized person updated in the face database 1420 to determine whether the user is authorized. The face comparator 1236 may compare facial feature information about the user in the current frame with facial feature information about the authorized person to determine whether the corresponding user is authorized. The authorization determined by the face comparator 1236 may be transmitted to the person position database updater 1235*a*.

The face database updater 1238 may update the face database 1420 by using the detected facial feature information when the user detected in the current video frame is an authorized person. Accordingly, the face database 1420 may be periodically and/or aperiodically updated with the latest facial feature information about the authorized person. Alternatively or additionally, if the user detected in the current video frame is an unauthorized person, the facial feature information extracted from the current video frame may be used without updating the face database 1420.

The object detection block 1233 may detect the type and number of objects including people in the input image IMG_in. The object detection block 1233 may determine a bounding box for the detected person. In the present disclosure, the object detection block 1233 may use an object detection model capable of recognizing various types of objects including people. The object detection block 1233 may transfer an indication of whether or not there is a security threat to the person position database updater 1235*a* of the unrecognized authorized person verification block 1235 based on the number and position of the detected person.

The unrecognized authorized person verification block 1235 may include a person position database updater 1235*a* and a person position comparator 1235*b*. The person position database updater 1235*a* may receive from the face comparator 1236 an indication of whether or not the person recognized in the current video frame is an authorized person. The person position database updater 1235*a* may receive an indication of whether or not the object detected by the object detection block 1233 is a security threat. The person position database updater 1235*a* may update the person position information in the person position database 1440 when it is determined that the face-recognized user is an authorized person and/or that the detected object does not pose a security threat.

The person position comparator 1235*b* may compare the person position information detected in the current video frame with the person position information stored in the person position database 1440 to determine the validity of the person position information of the current user. For example, when the face of the user is not normally recognized, the person position comparator 1235*b* may compare the person position information detected in the current video frame with the person position information stored in the person position database 1440. As another example, when the person position information in the current video frame and the person position information stored in the person position database 1440 are the same, the unrecognized authorized person verification block 1235 may inform the authentication decision block 1237 that the current location of the person is valid. Alternatively or additionally, if the position information about the person in the current frame and the position information about the person stored in the person position database 1440 are different, the unrecognized authorized person verification block 1235 may inform the authentication decision block 1237 that the current location of the person is invalid.

The number and arrangement of components of the face recognition block 1231 and the unrecognized authorized person verification block 1235 shown in FIG. 6 are provided as an example. In practice, there may be additional components, fewer components, different components, or differently arranged components than those shown in FIG. 6. Furthermore, two or more components shown in FIG. 6 may be implemented within a single component, or a single component shown in FIG. 6 may be implemented as multiple, distributed components. Alternatively or additionally, a set of (one or more) components shown in FIG. 6 may be integrated with each other, and/or may be implemented as an integrated circuit, as software, and/or a combination of circuits and software.

Figure 7:
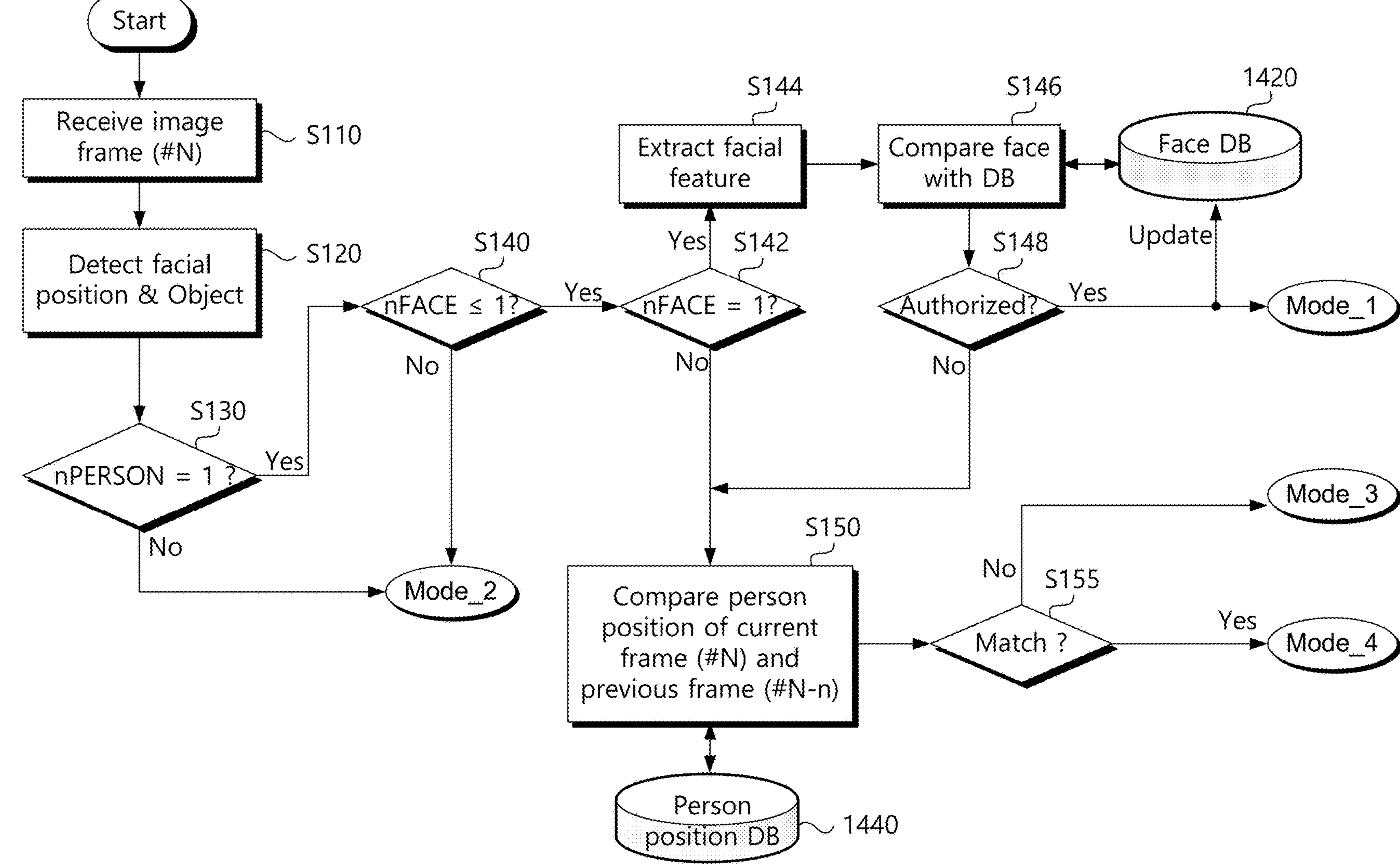
FIG. 7 is a flowchart showing the operation of the image analyzer, according to an embodiment of the present disclosure.

FIG. 7 is a flowchart showing the operation of the image analyzer according to the present disclosure. Referring to FIG. 7, when an unrecognized authorized person is detected due to factors such as, but not limited to, a motion of the user and/or a change in the environment, position information about a person detected as a result of face recognition and object recognition may be collected and processed. Accordingly, it may be possible to minimize a security gap when an unrecognized authorized person is detected.

In operation S110, the face recognition block 1231 and the object detection block 1233 of the image analyzer 1230 may receive the Nth frame #N of the input image transferred from the image converter 1210. The Nth frame #N may refer to image data subsampled at a rate of frames per unit time (e.g., FPS), and N may be a positive integer greater than zero (0).

In operation S120, the face recognition block 1231 and the object detection block 1233 may perform face position detection and object detection operations. The face recognition block 1231 may detect a face of a person in the received Nth frame #N. That is, the face recognition block 1231 may detect the position of a face of a person and the number of faces nFACE in the Nth frame #N. The object detection block 1233 may detect the type and number of objects, including people, in the current frame #N. The object detection block 1233 may calculate the position of a person detected through an object detection algorithm and the number of people nPERSON.

In operation S130, an operation branch occurs according to the position and number of detected people. If the number of detected people nPERSON is one (1) (Yes in operation S130), the procedure may proceed to operation S140. Alternatively or additionally, when the number of detected people nPERSON is not equal to one (1) (No in operation s310), the authentication decision block 1237 may determine the security mode as the second operation mode Mode_2, which may correspond to the security threat mode. For example, a case in which the number of people is not equal to one (1) may indicate either that no person has been detected or that two or more people have been detected.

In operation S140, the number of detected faces nFACE may be checked. If the number of detected faces nFACE is less than or equal to one (1) (Yes in operation S140), the procedure may proceed to operation S142. Alternatively or additionally, when the number of detected faces nFACE is greater than one (No in operation S140), the authentication decision block 1237 may determine the security mode as the second operation mode Mode_2, which may correspond to the security threat mode. Therefore, the video conferencing device 1000 may take security measures such as, but not limited to, blocking the screen of the video conferencing device 1000 and/or switching the operation mode to a locked state.

In operation S142, the procedure may include checking whether the number of detected faces nFACE is equal to one (1). If the number of detected faces nFACE is equal to one (1) (Yes in operation S142), the procedure may proceed to operation S144. Alternatively or additionally, when the number of detected faces nFACE is not equal to one (1) (e.g., when no faces are recognized) (No in operation S142), the procedure may proceed to operation S150. In operation S150, a security mode for an unrecognized person may be determined. A case where the face is not recognized may be and/or may include, for example, when face recognition is not possible due to at least one of a change in illumination, noise, a movement of the user, and the like.

In operation S144, the face recognition block 1231 may extract facial features by processing a face bounding box corresponding to the detected face position. The face recognition block 1231 may extract a facial feature using a method of detecting a dense feature of the face and/or detecting facial landmarks in the selected facial position region.

In operation S146, the face recognition block 1231 may compare the facial feature information about the user extracted from the current video frame #N with the latest facial feature information about the authorized person. The latest facial information about the authorized person may be provided by the face database 1420.

In operation S148, the face recognition block 1231 may perform a branching operation according to a comparison result between the facial feature information about the user extracted from the current video frame #N and the latest facial feature information about the authorized person. If the facial feature information about the user matches the authorized person (Yes in operation S148), the authentication decision block 1237 may determine the security mode as the first operation mode Mode_1, which may correspond to a normal mode. Alternatively or additionally, the face database 1420 may be updated with the facial feature information about the authorized person extracted from the current video frame #N. Alternatively or additionally, if the facial feature information about the user is inconsistent with the facial feature information about the authorized person (No in operation S148), the procedure may proceed to operation S150.

In operation S150, a security mode determination may be performed for an unauthorized person and/or an unrecognized authorized person. In operation S150, the unrecognized authorized person verification block 1235 may determine the security mode when the input image and/or video is blurred and/or covered due to the motion of the authorized person and/or a change in illumination, and/or when the state of the authorized person in the video frame is not good (e.g., does not meet a certain threshold). The unrecognized authorized person verification block 1235 may compare the person position information detected in the current video frame #N with the person position information in the previous video frame #N−n stored in the person position database 1440 to determine the validity of the location of the person in the current user position information. Here, n is a positive integer greater than zero (0). That is, when the face of the user is not normally recognized, the unrecognized authorized person verification block 1235 may compare the person position information detected in the current video frame #N with the person position information in the previous video frame #N−n stored in the person position database 1440. As used herein, the previous video frame #N−n may refer to the reference number of video frames for the authorized person stored before the current video frame #N.

In operation S155, if the person position information in the current video frame #N and the person position information in the previous video frame #N−n match and/or are the same (Yes in operation S155), the authentication decision block 1237 may determine the security mode as the fourth operation mode Mode_4. In an embodiment, the fourth operation mode Mode_4 may correspond to a policy of suspending the determination of the security threat and determining the security mode by processing a subsequent video frame. Accordingly, when the fourth operation mode Mode_4 is determined, the image analyzer 1230 may proceed with analysis of the next video frame #N+1. Alternatively or additionally, when the position information about the person in the current video frame #N and the position information about the person in the previous video frame #N−n are different, (No in operation S155), the authentication decision block 1237 may determine the security mode as the third operation mode Mode_3, which may correspond to the security threat mode.

According to the embodiments described above, the image analyzer 1230 may determine an operation mode according to the recognition and/or lack of recognition of a video conference user. That is, when an unrecognized authorized person is detected due to factors such as, but not limited to, user motion, noise, environmental change, and the like, the image analyzer 1230 may collect and process the position information about the person detected as a result of face recognition and object recognition. Accordingly, it may be possible to minimize a security gap when an unrecognized authorized person is detected.

FIG. 8 is a flowchart showing another embodiment of a method for determining a security mode according to the present disclosure. Referring to FIG. 8, when the detection result is delivered from the unrecognized authorized person verification block 1235, the authentication decision block 1237 may refer to whether or not the first operation mode Mode_1 has been determined in the previous video frame to determine the security mode of the current video frame.

In operation S210, the authentication decision block 1237 may receive the number of detected people nPERSON and/or the number of detected faces nFACE, and information on whether or not the person is an authorized person from the unrecognized authorized person verification block 1235.

In operation S220, the operation is branched depending on whether the number of people nPERSON detected by the object detection block 1233 is equal to one (1). If the number of people nPERSON is equal to one (1) (Yes in operation S220), the procedure proceeds to operation S230. Alternatively or additionally, if the number of people nPERSON is not equal to one (1) (No in operation S220), the authentication decision block 1237 may determine the operation mode as the second operation mode Mode_2, which may indicate a security threat mode. When the number of people is not equal to one (1), it may indicate, for example, that no person has been detected and/or that a plurality of people have been detected.

In operation S230, the authentication decision block 1237 may refer to the number of faces nFACE provided by the face recognition block 1231 and may perform operation branching. If the number of detected faces nFACE is equal to one (1) (Yes in operation S230), the procedure may proceed to operation S240. Alternatively or additionally, when the number of detected faces nFACE is not equal to one (1) (No in operation S230), the authentication decision block 1237 may determine the security mode as the second operation mode Mode_2.

In operation S240, the authentication decision block 1237 may compare the extracted facial feature information about the user with the facial feature information about the authorized person in the face database 1420 to determine whether the user is authorized or not. If the facial features of the user extracted from the current video frame correspond to the authorized person (Yes in operation S240), the authentication decision block 1237 may determine the security mode as the first operation mode Mode_1, which may indicate a normal mode. Alternatively or additionally, if the face of the user extracted from the current video frame does not match to the authorized person (No in operation S240), the procedure proceeds to operation S250.

In operation S250, a security mode determination may be made for an unrecognized authorized person. The authentication decision block 1237 may determine whether the unrecognized person has been identified as the first operation mode Mode_1 in a predetermined n number of previous frames.

If the security mode has been determined to be normal (e.g., Mode_1) in the same person position and face position in a frame before a specific number of frames (e.g., n) from the current video frame (Yes in operation S250), the authentication decision block 1237 may determine the security mode as the fourth operation mode Mode_4. The fourth operation mode Mode_4 may indicate a security mode of judgement suspension. Alternatively or additionally, if the first operation mode Mode_1 has not been determined in the person position and face position of frames before the reference time from the current frame (No in operation S250), the authentication decision block 1237 may determine the security mode to unrecognized person as the third operation mode Mode_3. That is, the authentication decision block 1237 may determine that the unrecognized person is a security threat.

As described above, the authentication decision block 1237 may access a previous determination as to whether or not the first operation mode Mode_1 has been determined in a predetermined number of previous video frames upon detection of an unrecognized person to determine the security mode of current video frame.

FIG. 9 is an exemplary table showing a security mode determination policy, according to an embodiment of the present disclosure. Referring to FIG. 9, when the face of the user is not recognized, the security mode may be determined based on the position information about the person in the previous video frame.

A case in which a face of the user is not recognized, that is, a case in which the number of faces is equal to zero (0), is described. In such a case, since the face of the user is not recognized, authentication using facial features may not be possible and/or may fail. When neither the face of the user nor the person is detected, the security mode may be determined as the second operation mode Mode_2.

If the face is not recognized, but the number of people nPERSON is equal to one (1) through object detection, the person may be an unrecognized authorized person. In such a case, the person position comparator 1235*b* may determine the security mode by referring to the history of determining the first operation mode Mode_1 in the same person position of the previous frame #N−n. If, in the previous frame #N−n, the position of the same person has been determined as the first operation mode Mode_1 (Yes in operation S250), the authentication decision block 1237 may determine the security mode as the fourth operation mode Mode_4. However, if the position of the same person in the previous frames #N−n has not been determined as the first operation mode Mode_1 (No in operation S250), the authentication decision block 1237 may determine the security mode to the third operation mode Mode_3.

When one (1) face is recognized (e.g., nFACE=1) and one (1) person is detected (e.g., nPERSON=1), the security mode may be determined based on whether the detected face is authorized. When the recognized face is identified as the face of the authorized person, the authentication decision block 1237 may determine the security mode as the first operation mode Mode_1. Alternatively or additionally, if the detected face is not the face of the authorized person, the authentication decision block 1237 may access the history of determining the first operation mode Mode_1 as the security mode at the same position of the person in the previous video frame #N−n. If the security mode has not been determined as the first operation mode Mode_1 at the same position of the person in the previous video frame #N−n (No in operation S250), the authentication decision block 1237 may determine the security mode to the third operation mode Mode_3. However, if the security mode has been determined as the first operation mode Mode_1 at the same position of the person in the previous video frame #N−n (Yes in operation S250), the authentication decision block 1237 may determine the security mode to the fourth operation mode Mode_4.

When two or more faces are recognized (e.g., nFACE≥2), the authentication decision block 1237 may determine the security mode as the second operation mode Mode_2, regardless of other conditions. Similarly, when two or more people are detected (e.g., nPERSON≥2), the authentication decision block 1237 may determine the security mode as the second operation mode Mode_2, regardless of other conditions.

It may be appreciated that the above-described security policy is merely illustrative, and that the present disclosure is not limited to the security policy described above. For example, other security policies may be implemented without departing from the scope of the present disclosure.

Figure 10:
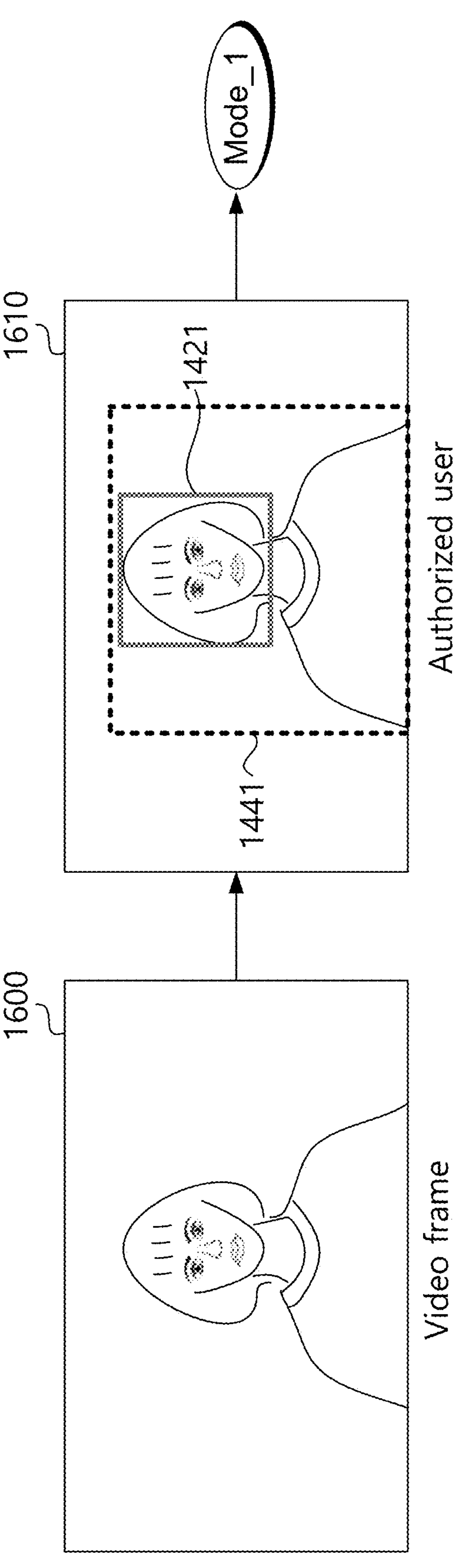
FIG. 10 shows an example in which a video frame is determined as a first operation mode Mode_1 according to the security policy, according to an embodiment of the present disclosure.

FIG. 10 shows an example in which a video frame is determined as a first operation mode Mode_1 according to the security policy, according to an embodiment of the present disclosure. Referring to FIG. 10, a video frame 1600 sampled from a video frame sub-sampler block 1213 may be processed by a face recognition block 1231 and an object detection block 1233, respectively. A face bounding box 1421 and an object bounding box 1441 may be allocated to the video frame 1610 as processed by the face recognition block 1231 and the object detection block 1233.

As shown in FIG. 10, the video frame 1600 may include one user. In the video frame 1600, the face bounding box 1421 indicating the face position and the number of faces nFACE may be detected by the face position detector 1232. Alternatively or additionally, facial features of the user may be extracted based on the face bounding box 1421. The face comparator 1236 may compare the extracted facial features with the authorized person information in the face database 1420 to determine whether the detected person is an authorized person and/or a non-authorized person. Alternatively or additionally, the object detection block 1233 may process the video frame 1600 to detect the object bounding box 1441 indicating the position of the person and the number of people nPERSON.

The authentication decision block 1237 may determine the security mode according to the security policy of FIG. 9. That is, one (1) face (e.g., nFACE=1) and one (1) person (e.g., nPERSON=1) may be detected in the video frame 1610 processed by the image analyzer 1230. Alternatively or additionally, as a result of identifying the authorized user/non-authorized user using the detected facial features, the user may be determined as an authorized user. When the recognized face of one user is confirmed as the face of the authorized person, the authentication decision block 1237 may determine the security mode as the first operation mode Mode_1. That is, the current video frame 1600 may be determined to be in a normal state with no security threat.

Figure 11:
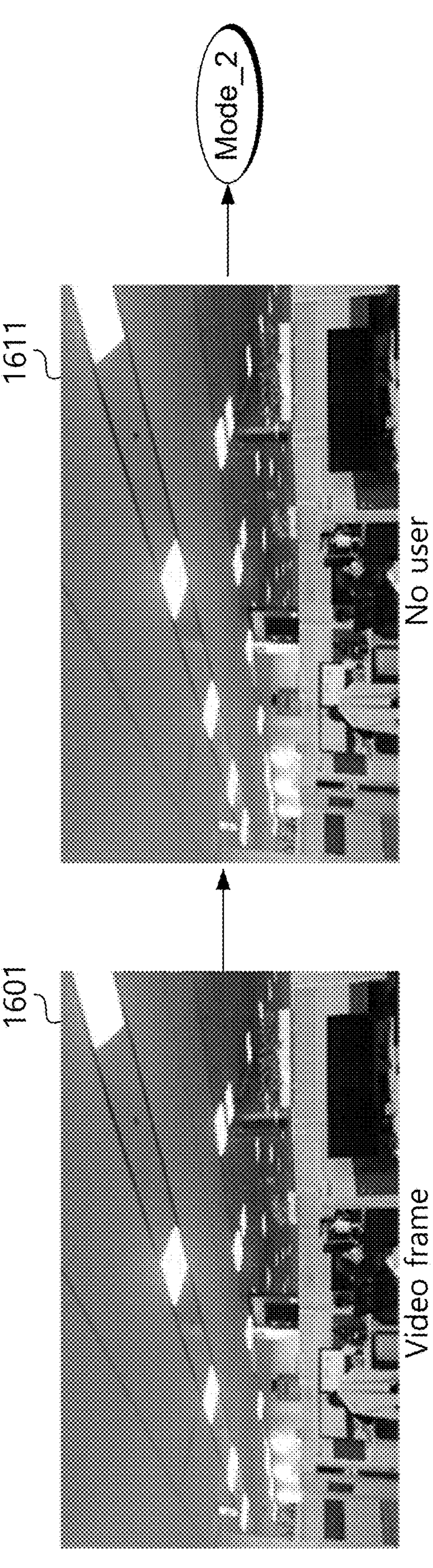
FIG. 11 shows an example in which a video frame is determined as a second operation mode Mode_2 according to the security policy, according to an embodiment of the present disclosure.

FIG. 11 shows an example in which a video frame is determined as a second operation mode Mode_2 according to the security policy, according to an embodiment of the present disclosure. Referring to FIG. 11, a video frame 1601 sampled from a video frame sub-sampler block 1213 may be processed by a face recognition block 1231 and an object detection block 1233, respectively. In the video frame 1611 processed by the face recognition block 1231 and the object detection block 1233, a face bounding box and an object bounding box may be displayed according to detection. However, if a face and/or a person are not detected, these bounding boxes may not appear in the processed video frame 1611.

As shown in FIG. 11, no person appears in the video frame 1601. In the video frame 1601, the face position and the number of faces nFACE are checked by the face position detector 1232. Since no person exists, the number of faces nFACE and the number of people nPERSON may each be identified as being equal to zero (0).

The authentication decision block 1237 may determine the security mode according to the security policy of FIG. 9. That is, the face recognition block 1231 and the object detection block 1233 may detect that no face exists (e.g., nFACE=0) and that no person exists (e.g., nPERSON=0) in the video frame 1611 processed by the image analyzer 1230. Then, the authentication decision block 1237 may determine the security mode as the second operation mode Mode_2. That is, the authentication decision block 1237 may determine that a security threat exists in the current video frame 1601.

Figure 12:
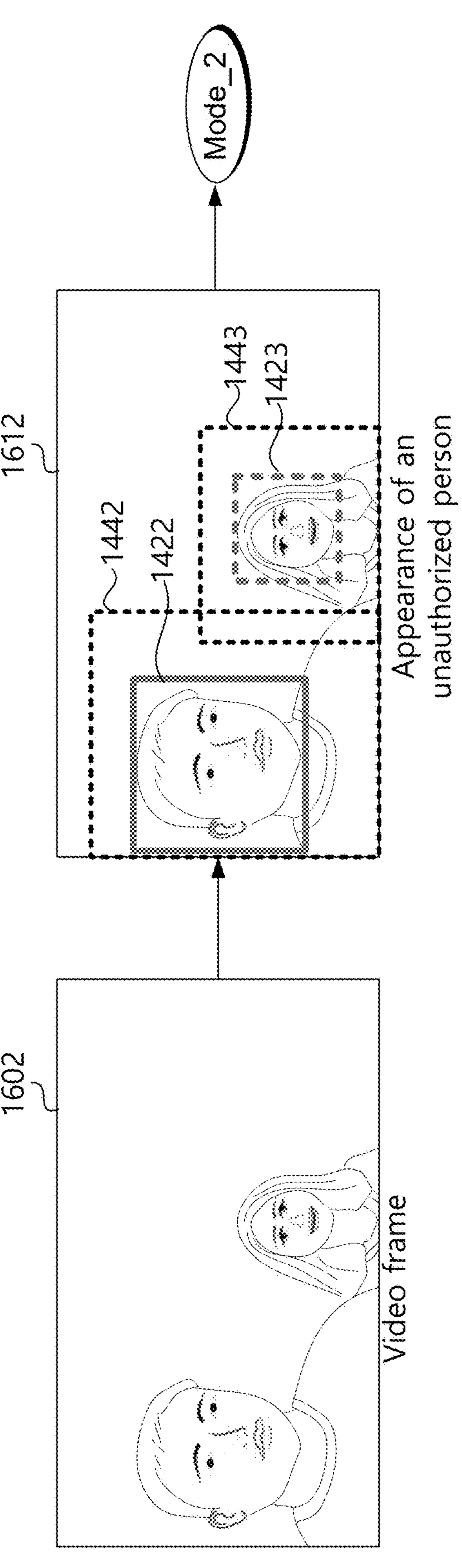
FIG. 12 shows a method of processing a video frame in which a plurality of people appear according to the security policy, according to an embodiment of the present disclosure.

FIG. 12 shows a method of processing a video frame in which a plurality of people appear according to the security policy, according to an embodiment of the present disclosure. Referring to FIG. 12, a video frame 1602 sampled from a video frame sub-sampler block 1213 may be processed by a face recognition block 1231 and an object detection block 1233, respectively. Alternatively or additionally, face bounding boxes 1422 and 1423 and object bounding boxes 1442 and 1443 may be respectively allocated to the video frame 1612 processed by the face recognition block 1231 and the object detection block 1233.

As shown in FIG. 12, two people may appear in the video frame 1602. In the video frame 1602, the face bounding boxes 1422 and 1423 indicating the face position and the number of faces nFACE based thereon may be detected by the face position detector 1232. Alternatively or additionally, facial features of the user may be extracted based on the face bounding boxes 1422 and 1423. In an embodiment, the object detection block 1233 may process the video frame 1602 to check the object bounding boxes 1442 and 1443 representing the location of a person and the number of people nPERSON based thereon.

According to the security policy, when two or more people and/or two or more faces are detected in the current video frame 1602, the security mode may be determined as the second operation mode Mode_2, which may unconditionally indicate a security threat. Accordingly, the authentication decision block 1237 may determine the second operation mode Mode_2 corresponding to two or more faces (e.g., nFACE≥2) and/or two or more persons (e.g., nPERSON≥2) being detected.

Figure 13:
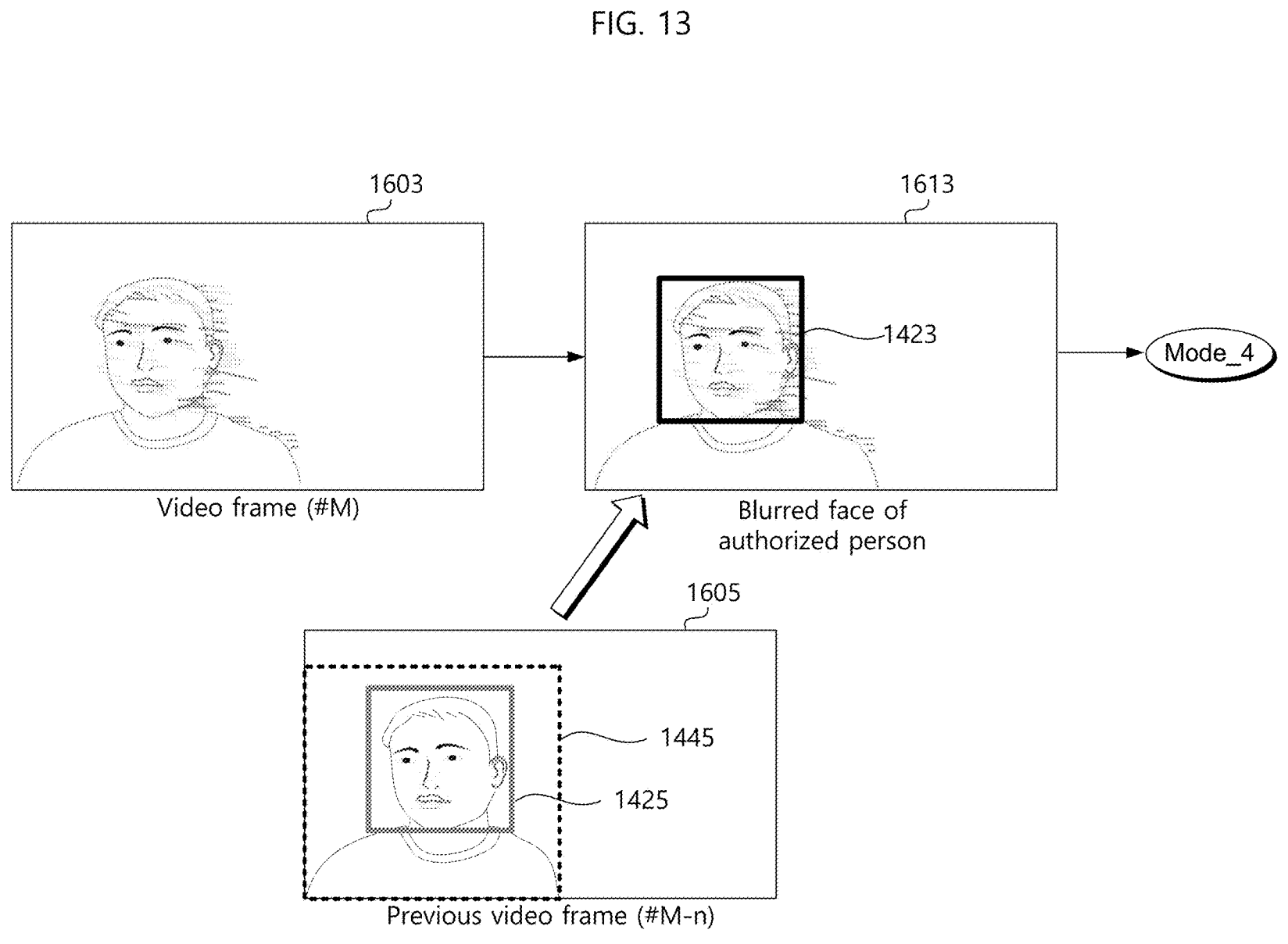

FIG. 13 shows an example in which a video frame is determined as a fourth operation mode Mode_4 according to the security policy, according to an embodiment of the present disclosure. Referring to FIG. 13, a video frame 1603 sampled from a video frame sub-sampler block 1213 may be processed by a face recognition block 1231 and an object detection block 1233, respectively.

As shown in FIG. 13, in the sampled video frame 1603, object recognition and face recognition may be difficult due to the motion of the user. A face bounding box 1425 may be displayed on the video frame 1613 processed by the face recognition block 1231 and the object detection block 1233. However, the face bounding box 1423 represents a case where the position of the face is detected, but the face feature is so blurry that it may not be extracted. In an embodiment, the object bounding box 1443 may be assigned by object recognition. That is, in the previous video frame 1605, one person position 1445 and one face bounding box 1425 corresponding to the authorized person were detected, but in the current video frame 1603, face characteristics of the authorized person may not be extracted. In such a case, the unrecognized authorized person verification block 1235 may refer to the person position 1445 of the previous video frame 1605 and may compare the face bounding box 1425 with the face bounding box 1423 of the current video frame 1613. When the position information about the person matches, the authentication decision block 1237 may determine the security mode as a fourth operation mode Mode_4, which may indicate a suspension of determination mode. That is, when the face of the authorized person in the previous video frame 1605 is blurred in the current video frame 1603 and may not be recognized, the authentication decision block 1237 may set the fourth operation mode Mode_4 instructing to suspend the determination of the security mode.

As described above, by designating the unrecognized user as the fourth operation mode Mode_4, the video conferencing device 1000 may continue processing the next video frame. If the face of the authorized person is normally recognized in the next video frame, the video conferencing device 1000 may operate normally.

While the present disclosure has been described with reference to embodiments thereof, it may be apparent to those of ordinary skill in the art that various changes and modifications may be made thereto without departing from the spirit and scope of the present disclosure as set forth in the following claims.

What is claimed is:

1. A method of analyzing an image detected by a camera, comprising:
- sampling, by an image converter, a current frame from a video frame;
- detecting, by an image analyzer, at least one face and an object in the current frame;
- determining, by the image analyzer, based on the detecting of the at least one face and the object, a number of people, a number of faces, and whether a facial feature in the current frame corresponds to an authorized person; and
- selecting, by the image analyzer, a security mode based on the number of people, the number of faces, whether the facial feature corresponds to the authorized person, and another security mode corresponding to a previous frame of the video frame,
- wherein the selecting of the security mode comprises accessing, based on the at least one face not being recognized, position information about the authorized person in at least one previous frame stored in a database.

2. The method of claim 1, wherein the selecting of the security mode further comprises:
- selecting a security threat mode as the security mode based on determining that at least one of the number of people is greater than one and the number of faces is greater than one.

3. The method of claim 1, wherein the selecting of the security mode further comprises:
- selecting a normal mode as the security mode based on determining that the number of people is equal to one, the number of faces is equal to one, and the facial feature corresponds to the authorized person; and
- selecting a security threat mode as the security mode based on determining that the number of people is equal to one, the number of faces is equal to one, and the facial feature does not correspond to the authorized person.

4. The method of claim 3, further comprising:
- updating, based on the selecting of the normal mode as the security mode, on the database, a position of the facial feature of the authorized person, the facial feature of the authorized person, and the position information about the authorized person.

5. The method of claim 1, wherein the selecting of the security mode further comprises:
- accessing, in the database, based on determining that the number of people is equal to one and the facial feature does not correspond to the authorized person, the position information about the authorized person in the at least one previous frame stored and a detection history of the authorized person.

6. The method of claim 5, wherein the selecting of the security mode further comprises:
- selecting a judgment suspension mode as the security mode based on determining that the number of people is equal to one, the facial feature does not correspond to the authorized person, position information about a person in the current frame matches position information about the person in the previous frame, and the person has been detected as the authorized person.

7. The method of claim 5, wherein the selecting of the security mode further comprises:
- selecting a security threat mode as the security mode based on the number of people being equal to one, the at least one face not being recognized, position information about a person in the current frame matching position information about the person in the previous frame, and the person not being detected as the authorized person.

8. The method of claim 1, wherein the selecting of the security mode further comprises:
- selecting a security threat mode as the security mode based the number of people being equal to zero and the number of faces being equal to zero.

9. A video conferencing device for determining a security mode by processing a video stream provided through a camera, comprising:
- an image converter configured to sample, from the video stream, a video frame; and
- an image analyzer configured to:
  - detect, in the video frame, at least one face and an object; and
  - select the security mode by detecting whether a number of people, a number of faces, and facial features in the video frame correspond to an authorized person, and based on another security mode corresponding to a previous frame of the video stream,
  - wherein the image analyzer is further configured to select the security mode by referring to information of the authorized person extracted from at least one previous video frame based on the at least one face not being recognized in the video frame.

10. The video conferencing device of claim 9, wherein the image analyzer comprises:
- a face recognition block configured to extract the number of faces and the facial features from the video frame, and to compare the extracted facial features with the facial features of the authorized person;
- an object detector configured to detect the number of people comprised in the video frame and to detect a position of the authorized person; and
- an unrecognized authorized person verification block configured to determine whether a user is authorized by using person position information about the authorized person extracted from the at least one previous video frame based on the number of people appearing in the video frame being equal to one and the at least one face of the user not being recognized.

11. The video conferencing device of claim 10, wherein the unrecognized authorized person verification block is further configured to compare the person position information about the user in the video frame with the person position information about the authorized person in the at least one previous video frame.

12. The video conferencing device of claim 11, further comprising:

an authentication decision block configured to determine whether a security threat to the user is present based on a comparison result of the person position information in the video frame and the at least one previous video frame.

13. The video conferencing device of claim 12, wherein the authentication decision block is further configured to:

suspend the selection of the security mode based on the person position information about the user in the video frame matching the person position information about the authorized person in the at least one previous video frame.

14. The video conferencing device of claim 13, wherein the authentication decision block is further configured to:

select a security threat mode as the security mode based on the person position information about the user in the video frame and the person position information about the authorized person in the at least one previous video frame being different.

15. The video conferencing device of claim 14, wherein the authentication decision block is further configured to:

select a normal mode as the security mode based on the number of people being equal to one, the number of faces being equal to one, and the facial features in the video frame corresponding to the authorized person; and select the normal mode as the security mode based on the number of people being equal to one, the number of faces being equal to one, and the facial features in the video frame corresponds to an unauthorized person.

16. The video conferencing device of claim 14, wherein the authentication decision block is further configured to:

select the security threat mode as the security mode based on at least one of the number of people being greater than one the number of faces being greater than one.

17. The video conferencing device of claim 9, wherein the image analyzer further comprises:

a face database updater configured to update, in a face database, a facial feature of a user based on the facial feature of the user in the video frame matching the authorized person.

18. The video conferencing device of claim 10, wherein the unrecognized authorized person verification block further comprises:

a person position database updater configured to update, in a person position database, the person position information about the user based on the user being the authorized person and the video frame being selected to not pose a security threat.

19. A video analysis method for determining a security mode of a video stream, comprising:

detecting a number of people, a number of faces, and at least one facial feature in a frame sampled from the video stream; and selecting the security mode based on at least one of the number of people, the number of faces, whether the at least one facial feature corresponds to an authorized person, and another security mode corresponding to a previous frame of the video stream, wherein the selecting of the security mode comprises determining, based on a face not being recognized in the frame, the security mode of the frame according to information about the authorized person detected in at least one previous frame sampled prior to the frame.

20. The method of claim 19, wherein the information about the authorized person corresponds to position information about a position of the authorized person in the at least one previous frame.

* * * * *